(12) United States Patent
Brown

(10) Patent No.: US 9,075,292 B1
(45) Date of Patent: Jul. 7, 2015

(54) TRAIL CAMERA CAMOUFLAGE COVER

(71) Applicant: Gavin Brown, Seattle, WA (US)

(72) Inventor: Gavin Brown, Seattle, WA (US)

(*) Notice: Subject to any disclaimer, the term of this patent is extended or adjusted under 35 U.S.C. 154(b) by 0 days.

(21) Appl. No.: 14/077,841

(22) Filed: Nov. 12, 2013

Related U.S. Application Data

(60) Provisional application No. 61/835,205, filed on Jun. 14, 2013.

(51) Int. Cl.
*G03B 29/00* (2006.01)

(52) U.S. Cl.
CPC ........................................ *G03B 29/00* (2013.01)

(58) Field of Classification Search
CPC .............................. G04B 29/00; H04N 5/225
USPC ................................... 396/427, 433; 348/151
See application file for complete search history.

(56) References Cited

U.S. PATENT DOCUMENTS

| | | | |
|---|---|---|---|
| 2,464,067 A | 3/1949 | Barker | |
| 5,549,938 A | 8/1996 | Nesbitt | |
| 6,445,408 B1 | 9/2002 | Watkins | |
| 6,449,431 B1 * | 9/2002 | Cuddeback et al. | ............ 396/27 |
| 6,768,868 B1 * | 7/2004 | Schnell | ......................... 396/263 |
| 6,970,183 B1 | 11/2005 | Monroe | |
| 7,066,662 B2 * | 6/2006 | Cuddeback et al. | .......... 396/427 |
| 7,471,334 B1 * | 12/2008 | Stenger | ......................... 348/373 |
| 7,534,056 B2 * | 5/2009 | Cross et al. | .................... 396/427 |
| 8,256,611 B2 | 9/2012 | Merrill et al. | |
| 2005/0053732 A1 * | 3/2005 | Tilby | .............................. 428/17 |
| 2005/0212912 A1 | 9/2005 | Huster | |
| 2007/0193901 A1 | 8/2007 | Cohen | |
| 2009/0194443 A1 * | 8/2009 | Cuddeback | ................. 206/316.2 |
| 2011/0242315 A1 * | 10/2011 | Barley et al. | ................... 348/143 |
| 2012/0186737 A1 * | 7/2012 | Burdine et al. | ................ 156/249 |
| 2013/0188047 A1 * | 7/2013 | Slevin et al. | ................... 348/143 |

OTHER PUBLICATIONS

Spypoint BF-10HD Trail Camera, www.spypoint.com, Mar. 27, 2013.*
Mossy Oak Matte Camo Game Camera Security Box Skin, www.mossyoakgraphics.com, Jan. 19, 2011.*

* cited by examiner

*Primary Examiner* — Rodney Fuller
(74) *Attorney, Agent, or Firm* — Timothy E. Siegel Patent Law, PLLC; Timothy E. Siegel

(57) ABSTRACT

A method for camouflaging a trail camera in a variety of natural environments by sequentially using a variety of interchangeable camouflaged covers. Also disclosed is a camouflaged cover for a trail camera, and a kit containing a plurality of variously camouflaged covers for camouflaging a trail camera in a variety of natural environments.

8 Claims, 3 Drawing Sheets

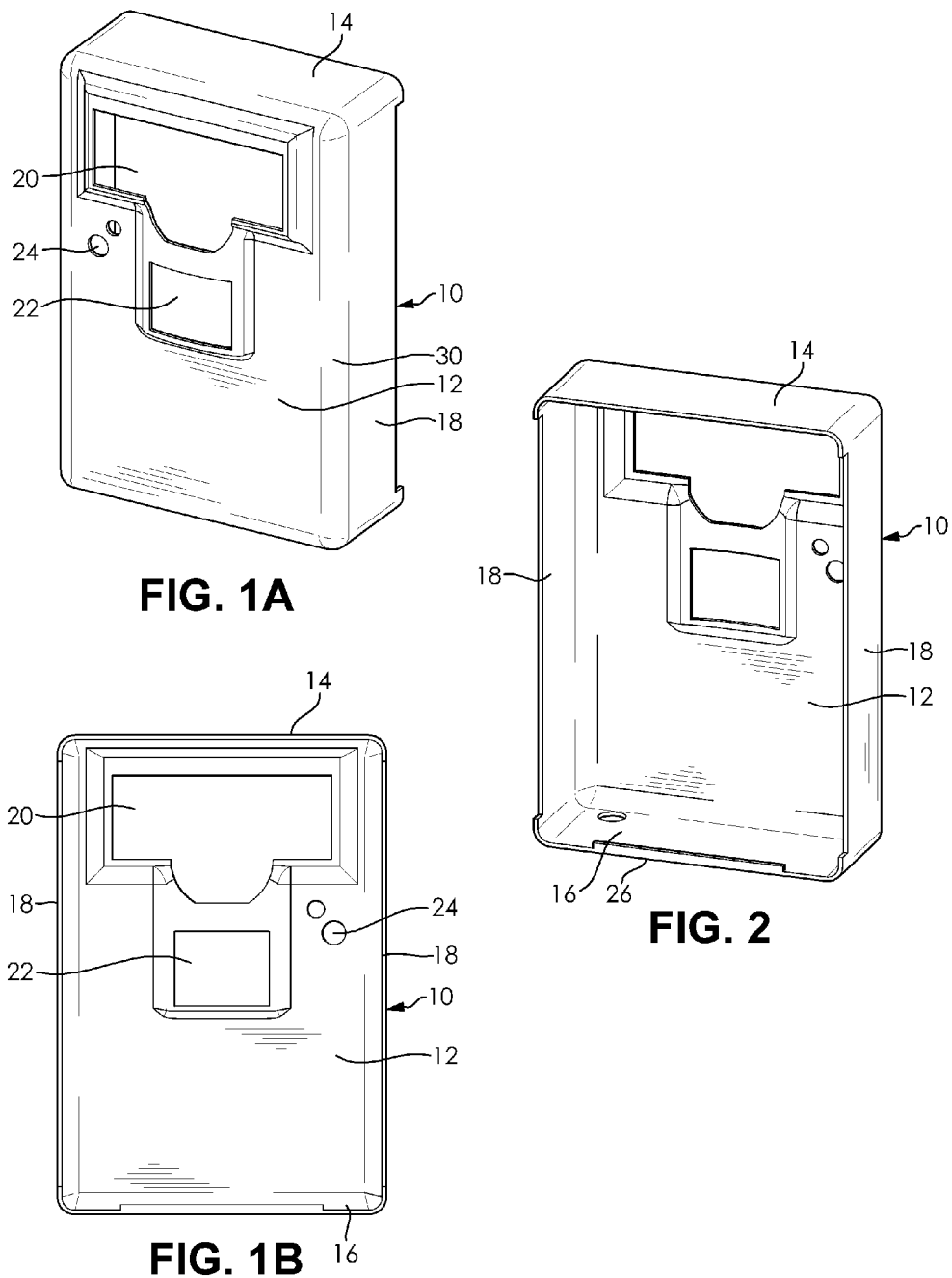

TRAIL CAMERA CAMOUFLAGE COVER

RELATED APPLICATIONS

This application claims priority from provisional application No. 61/835,205, filed Jun. 14, 2013, which is hereby incorporated by reference as if fully set forth herein.

BACKGROUND

Trail cameras are often used to identify locations frequented by animals, to determine what species of animals or specific individuals are present in a location, or to determine the times when animal activity in an area tends to occur. Such information can be helpful to hunters, researchers, hobbyists such as bird-watchers, and those protecting the security of property. For a trail camera to be effective, the camera's presence must not disrupt the natural behavior of the animals. It may also be desirable that the camera not interfere with the natural beauty of the environment. Also, it is preferable that the trail camera not attract the attention of trail camera thieves.

Camouflaged trail cameras are available which incorporate some type of color or texture into the camera case. These cameras are available in a variety of camouflage patterns, each intended for use in a specific natural environment. As trail cameras are relatively expensive and bulky, it is impractical for the user to purchase and carry multiple cameras for use in different environments. Thus, there is a need in the art for a way to camouflage one trail camera to blend in with a variety of environments.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a method for camouflaging a trail camera in different environments. A first camouflaged cover is used on the camera in a first environment. Then the first cover is removed and a second camouflaged cover is used on the camera in a second environment.

In a second separate aspect, the present invention may take the form of a kit for camouflaging a trail camera. The kit contains multiple covers, each camouflaged appropriately for a different environment. The covers fit interchangeably on a trail camera.

In a third separate aspect, the present invention may take the form of a cover for a trail camera which resembles tree bark.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced drawings. It is intended that the embodiments and figures disclosed herein are to be considered illustrative rather than restrictive.

FIG. 1A is a front view of a trail camera cover according to the present invention.

FIG. 1B is a rear view of a trail camera cover according to the present invention.

FIG. 2 is a rear view of a trail camera cover according to one embodiment of the present invention.

DETAILED DESCRIPTION

Figure 3A:
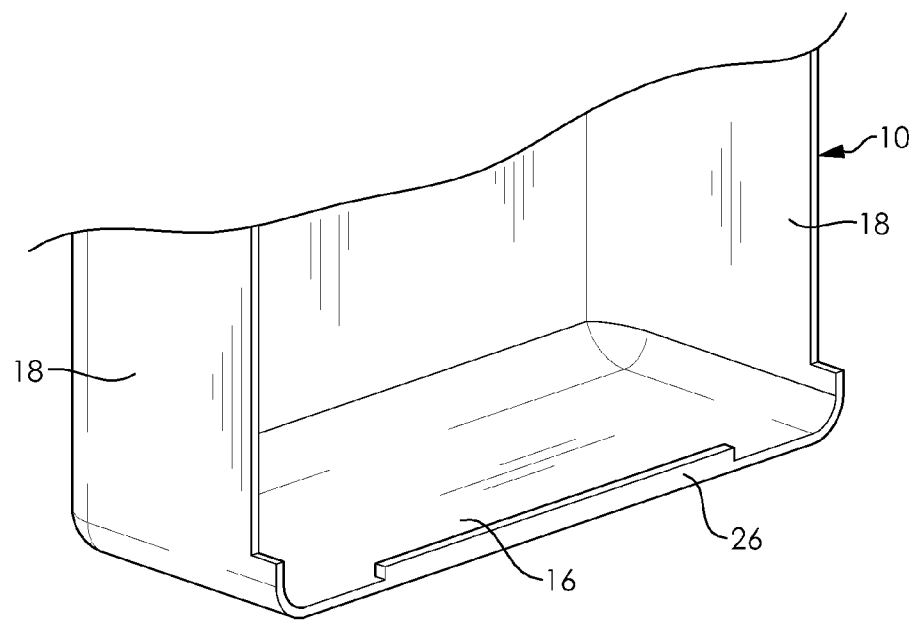
FIG. 3A is a perspective view of the bottom portion of a trail camera cover according to the present invention.

Referring to FIGS. 1A and 1B, in one embodiment, the invention may take the form of a removable cover 10 that helps a trail camera blend into the natural environment. The cover 10 has a front wall 12. A top wall 14, bottom wall 16 and side walls 18 extend rearwardly from front wall 12.

In one embodiment, the cover 10 is designed such that it does not interfere with the operation of the trail camera. Camera features such as lenses, light sensors, motion detectors and the like are not blocked or interfered with by the cover. In one embodiment, the front wall 12 defines opening 20, which allows light from the camera flash to illuminate the environment and light from the environment to enter the camera lens. Also, an opening 22 allows light to enter the camera light sensor, and an opening 24 allows light to enter the camera motion detector. Alternative embodiments of cover 10 define openings which permit the camera to retain the functionality of additional or different features. In one embodiment, openings 20, 22, and 24 are located on cover 10 such that cover 10 does not interfere with the function of camera features of more than one brand or style of trail camera.

Figure 3B:
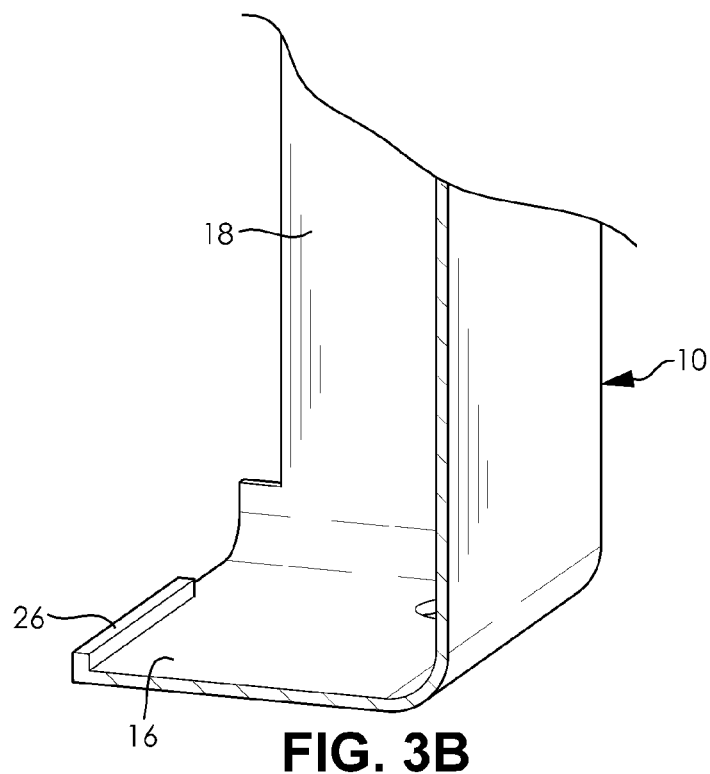
FIG. 3B is a side sectional view of the bottom portion of a trail camera cover according to the present invention.

Referring now to FIGS. 2, 3A and 3B, in one embodiment, the attachment of the cover 10 to the trail camera is aided by means of a thin rim 26, which protrudes upwardly from bottom wall 16. The rim 26 aids the attachment of the cover by, for example, engaging a seam in the exterior surface of the trail camera. In an alternative embodiment a rim protrudes from the top wall 14 or a side wall 18, and performs a parallel function to rim 26.

The cover 10 has an exterior surface 30 that is designed to blend in with a particular environment, for example by having a molded three-dimensional texture of, for example, a type of tree bark. The exterior surface 30 may be painted instead of, or in addition to, being molded in order to increase the effectiveness of the camouflage.

Figure 4A:
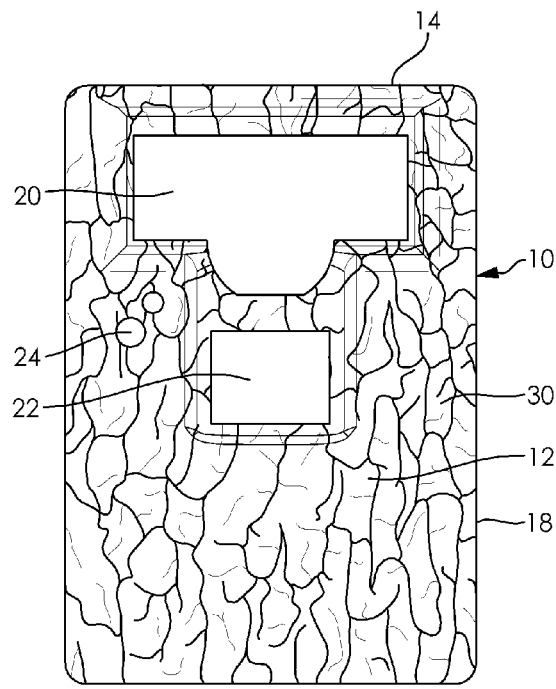
FIG. 4A is a front view of a trail camera cover having a first camouflage design according to the present invention.
Figure 4B:
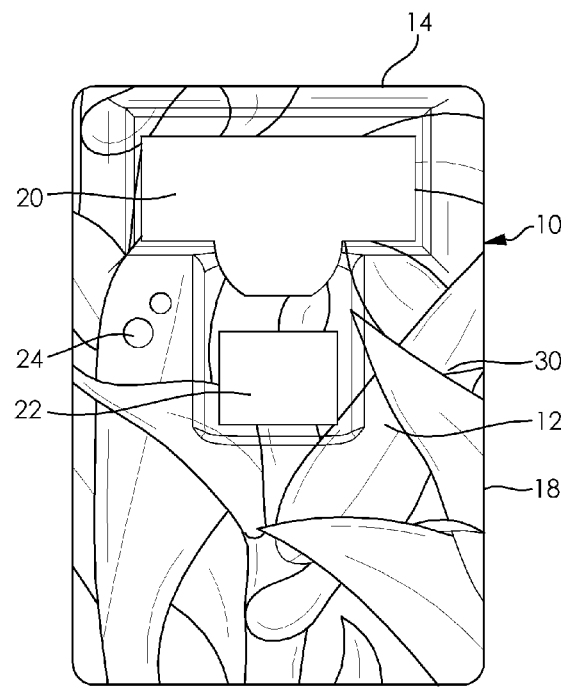
FIG. 4B is a front view of a trail camera cover having a second camouflage design according to the present invention.

Referring now to FIGS. 4A and 4B, in one embodiment, different designs can be molded or painted on the exterior surface 30 to camouflage a trail camera in different environments. In a preferred embodiment, a variety of covers with different designs molded or painted on the exterior surface 30 are available for a given type of camera. For example, the exterior surface 30 of one cover 10 can have a first camouflage design 32, while the exterior surface 30 of a second cover 10 can have a second camouflage design 34. The exterior surface 30 can be made to resemble any desired natural surface or environment. For example, the exterior surface 30 can be made to resemble eastern white pine bark, burnt timber bark, oak tree bark, sagebrush, corn stalks, or aspen bark. Other designs which resemble different environments may also be used.

In a variety of embodiments, cover 10 can be made to fit any brand or style of trail camera without interfering with the operation of the trail camera. The dimensions of front wall 12, top wall 14, side walls 18 and bottom wall 16 are designed so that cover 10 fits snugly over the desired brand or style of trail camera. Brands of trail cameras for which covers can be made include, but are not limited to, Browning, Bushnell, Covert, Cuddeback, Moultrie, Pix Controller, Plot Watcher, Primos, Reconyx, Scoutguard, SpyPoint, Stealth, Tasco, Uway, Wildgame, and Wildview. In an alternative embodiment, cover 10 fits over and may be used with a variety of different trail camera brands and styles. For example, openings 20, 22 and 24 can be combined into a large window that permits both lens and sensors to see out.

In a preferred embodiment, the cover 10 can be easily attached and detached from a trail camera. Attachment to a trail camera can be accomplished with any appropriate retention assembly, including but not limited to clips, screws, snaps, buckles, hook-and-loop closures or by means of a snug or tight fit. In one embodiment, as disclosed above, the cover 10 can be constructed as a single piece which fits over the front and, optionally, the sides of a trail camera. In an alternative embodiment, the cover 10 can be constructed as two pieces (not shown) which fit around a trail camera and fasten to each other with any appropriate retention assembly, including but not limited to clips, screws, snaps, buckles, or hook-and-loop closures.

In some embodiments, the cover 10 is easily interchangeable. One embodiment takes the form of a method for camouflaging a single trail camera in a variety of different natural environments by replacing a cover having one camouflage design on the exterior surface 30 with a cover having a different camouflage design on the exterior surface 30 is placed on the camera. For example, a user can attach a first cover to a camera, so that it blends in with a first environment (for example, oak tree bark), use the camera in the first environment, then remove the first cover, attach a second cover to the same camera so that it blends in with a second environment (for example, corn stalks), and use the camera in the second environment. In this manner, the user is not required to either purchase different trail cameras for use in different environments or to settle for less effective camouflage when sequentially placing one camera in a variety of environments.

In one preferred embodiment a three dimensional texture is provided on the face plate using a product designated as Smooth-On 300. To form a rubber impression of tree bark, a product designated as Vytaflex is used. The mold formed is filled in with Smooth-On which thereby forms into the tree bark pattern. Both Smooth-On 300 and Vytaflex are available from Smooth-On, Inc., which maintains a place of business at 2000 Saint John Street, Easton Pa. 18042.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

I claim:

1. A method of using a substantially rectangular trail camera, comprising:
   (a) providing a first cover having a front wall, top wall, bottom walls and side walls, and defining a solid rectangle of space, between the side walls and top and bottom walls and having a first daylight natural setting camouflage design over the front of the front wall and, wherein the first cover has a ridge along the back of the bottom wall, and wherein the ridge retains the camera, after the camera has been placed in the cover, fitting the camera into the first cover so that the camera fits within the rectangle of space leaving the rear of the camera uncovered;
   (b) using the camera with the first cover in a first environment;
   (c) removing the first cover;
   (d) providing a second cover having the same shape as the first cover, but having a second daylight natural setting camouflage design over the front of the camera, fitting the camera into the second cover, while leaving the rear of the camera uncovered; and
   (e) using the camera with the second cover in a second environment.

2. The method of claim 1, wherein the first camouflage design includes both color and a molded impression of tree bark.

3. The method of claim 2, wherein said first daylight natural setting camouflage design is of a first type of tree bark, and has the texture of said first type of tree bark and said second daylight natural setting camouflage design is of a second type of tree bark, and has the texture of said second type of tree bark.

4. A kit for camouflaging a trail camera, comprising a first cover and a second cover wherein the first cover and the second cover are configured to each define an interior rectangle of space into which a trail camera can fit and to detachably connect to the front and about the sides of a trail camera, leaving the rear uncovered, and wherein the first cover and the second cover have different daylight natural setting camouflage designs, and wherein said first and second cover each has a ridge along the back of the bottom wall, and wherein the ridge retains the camera, after the camera has been placed in the cover.

5. The kit of claim 4, further comprising at least one additional cover having a natural setting camouflage design different from either the first cover or the second cover.

6. The kit of claim 4, wherein the natural setting camouflage designs include both color and a surface molded in the shape of a natural feature.

7. The kit of claim 6 wherein said first natural setting camouflage design is of tree bark, and has the molded impression of a type of tree bark.

8. The kit of claim 4, wherein at least one cover is made of one piece only, said one piece being configured to detachably connect to the trail camera.

* * * * *